__United States Patent__ [19]

Rathburn

[11] Patent Number: 4,468,952

[45] Date of Patent: Sep. 4, 1984

[54] HYDRAULIC PIPE TESTING TOOL WITH COMBINED ANTI-EXTRUSION AND ANCHOR MEANS

[76] Inventor: Lloyd C. Rathburn, 701 Falling Leaf, Friendswood, Tex. 77546

[21] Appl. No.: 403,791

[22] Filed: Jul. 30, 1982

[51] Int. Cl.³ .............................................. G01M 3/28
[52] U.S. Cl. ...................................... 73/40.5 R; 73/46
[58] Field of Search ..................... 73/40.5 R, 46, 49.1, 73/49.5

[56] References Cited

U.S. PATENT DOCUMENTS

| | | | |
|---|---|---|---|
| 3,371,521 | 3/1968 | Hauk | 73/46 |
| 3,503,249 | 3/1970 | Dumond | 73/49.1 |
| 3,921,437 | 11/1975 | Hauk | 73/46 X |
| 4,010,633 | 3/1977 | Hasha | 73/46 |
| 4,182,159 | 1/1980 | Churchman | 73/40.5 R |

Primary Examiner—Gerald Goldberg
Assistant Examiner—Joseph W. Roskos
Attorney, Agent, or Firm—Arnold, White & Durkee

[57] ABSTRACT

In accordance with an illustrative embodiment of the present invention, a hydraulic pipe testing tool comprises a body member carrying longitudinally spaced, normally retracted packing and anti-extrusion members that are expanded into sealing and abutting engagement with the surrounding walls of a well pipe being tested. The anti-extrusion member includes inwardly biased arcuate segments that carry gripping elements which bite into the pipe to anchor the tool against longitudinal movement during testing operations.

8 Claims, 8 Drawing Figures

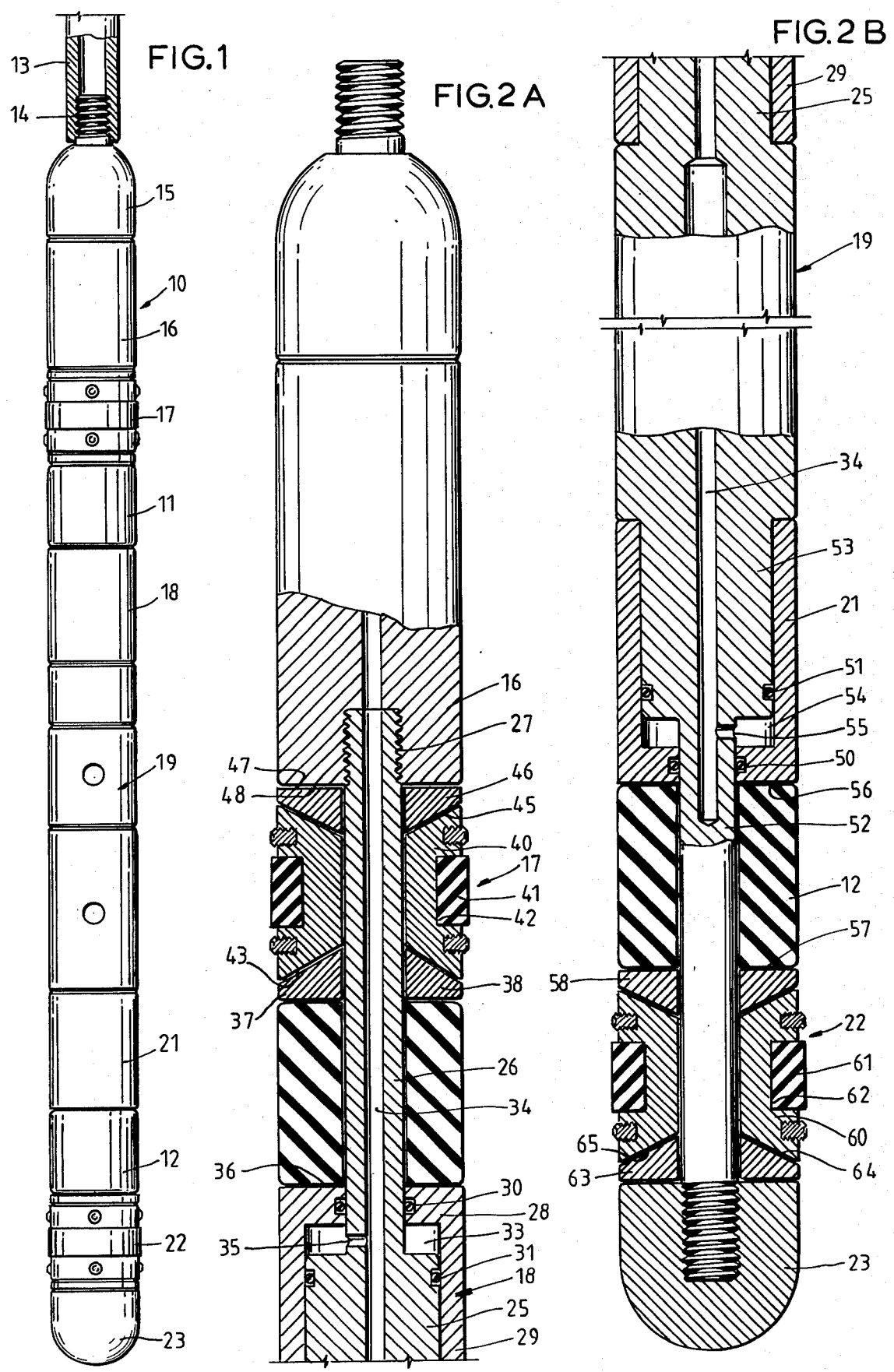

HYDRAULIC PIPE TESTING TOOL WITH COMBINED ANTI-EXTRUSION AND ANCHOR MEANS

FIELD OF THE INVENTION

This invention relates generally to hydraulic pipe testing equipment, and particularly to a new and improved test tool having means to anchor the same against longitudinal movement in a well pipe being tested for leaks by the application of fluid under pressure.

BACKGROUND OF THE INVENTION

In testing the threaded connections between sections of pipe for leaks, it is common practice to insert into the bore of the pipe a test tool having a body member with spaced packers thereon that straddle the joint to be tested. After the packers have been expanded, fluid pressure is applied to the annular region between the packers adjacent the threaded joint to determine if the same is leakproof. When a test tool of the type described is used to test a threaded joint between two sections of pipe having different internal diameters, for example where the two sections have differing weights and wall thicknesses, or where two different size pipes are joined together by an adaptor sub, a significant problem arises. The difference in transverse cross-sectional areas sealed off by the packer elements creates a piston effect so that the pressure of the test fluid tends to blow the test tool out of the pipe. Such an occurrence can be extremely dangerous to personnel operating the equipment, and results in serious damage to the equipment itself.

It is the general object of the present invention to provide a new and improved test tool of the type described that includes means to anchor the tool against movement in the pipe even when the packer elements are sealed against different internal pipe section diameters during a testing operation.

SUMMARY OF THE INVENTION

This and other objects are attained in accordance with the concepts of the present invention through the provision of a test tool apparatus comprising an elongated body member having spaced, normally retracted packer elements mounted thereon that are adapted to be expanded into sealing engagement with the internal walls of well pipe sections on opposite sides of the connection therebetween. Each packer elements have mounted adjacent thereto an anti-extrusion device which comprises a plurality of arcuate metallic segments normally held together as a contracted annular unit by a circumscribing band of elastomeric material that is positioned in external annular recesses or grooves in the segments. The ends of the segments are shaped to form inverted conical surfaces, and conically-shaped rings are arranged to engage the said surfaces of the segments to cause them to be expanded outwardly as the packer elements are expanded to prevent extrusion of the packer elements. At least some of the segments of at least one of the anti-extrusion devices is provided with gripping means on its outer periphery that engages the inner wall of the pipe to anchor the test tool against longitudinal movement in response to the piston effect mentioned above. The gripping elements can take various forms, however the present invention is well adapted for providing safer testing operations then have heretofore been known in the art.

BRIEF DESCRIPTION OF THE DRAWINGS

The present invention has other objects, features and advantages which will become more clearly apparent with the following detailed description of the preferred embodiment taken in conjunction with the appended drawings in which FIG. 1 is a side elevation view of a hydraulic pipe testing tool that incorporates the present invention;

FIGS. 2A and 2B are longitudinal sectional views, with the portions in elevation, illustrating further structural details of the test tool of FIG. 1;

DETAILED DESCRIPTION OF A PREFERRED EMBODIMENT

Figure 3:
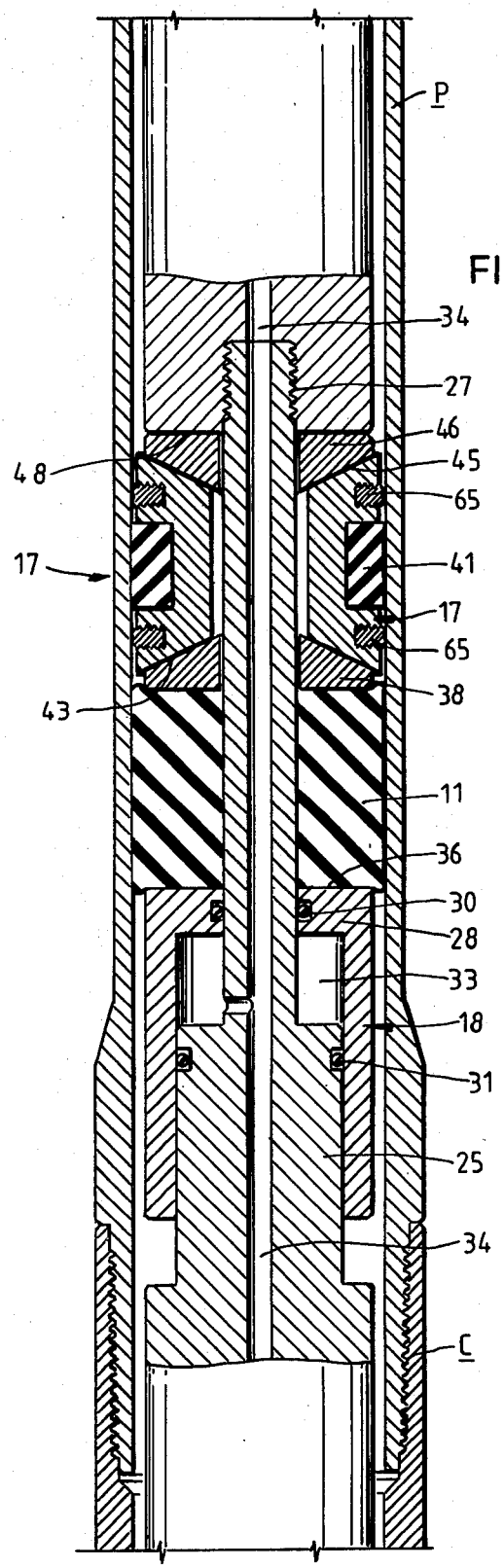
FIG. 3 is a view similar to FIG. 2 showing one of the packer elements and the anti-extrusion devices in expanded condition in the pipe.

Referring initially to FIG. 1, a pipe testing tool that is constructed in accordance with the present invention is indicated generally at 10. The tool 10 includes an elongated body having axially-spaced, normally retracted packer elements 11 and 12 that are adapted to be expanded into sealing engagement with the surrounding well tubing wall in response to the application of hydraulic fluid pressure via a conduit 13 that is attached to the upper end of the body and by means of which it is lowered into, and suspended within, the tubing. The lower end of the conduit 13 may be threaded to an adaptor 14 on an upper end section 15 which is connected to a valve section 16 located above the upper packer element 11. An anti-extrusion 17 is located between the lower end of the valve section 16 and the upper end of the packer element 11, and a hydraulically operable upper sleeve piston 18 is slidably mounted below the upper packer element on a tubular main section 19 of the body member. The lower portion of the main section 19 carries another hydraulically operable sleeve piston 21 that is slidably mounted above the lower packer element 12, and a lower anti-extrusion device 22 is mounted between the lower end of the packer element 12 and a bottom nose section 23 of the body. As will be described in greater detail below, a central passage extends longitudinally through the body and is arranged to conduct pressurized fluid to variable capacity chambers formed in the sleeve pistons 18 and 21 in order to cause compression and expansion of the packer elements 11 and 12. Valve systems within the main section 19 of the body are arranged to enable pressurized fluids to enter the enclosed annular space between the packer elements and the well tubing wall. Further details of such valve systems and other components of the tool 10 may be seen in U.S. Pat. No. 3,165,918 issued Jan. 19, 1965, the disclosure of which is incorporated herein by reference.

Referring now to FIGS. 2A and 2B for further details of the apparatus of the present invention, the main section 19 of the body has a reduced diameter portion 25 and a stem 26 which is threaded at 27 into the lower end of the upper valve section 16. The sleeve piston 18 includes an inwardly directed flange 28 having a depending skirt 29, with the flange being sealed with respect to the stem 26 by a seal ring 30 and the skirt 29 being sealed with respect to the reduced diameter section 25 by a seal ring 31. A variable capacity annular chamber 33 thus is formed between the stem 26 and the skirt 29, and is communicated with a central passage 34 of the body by a radial port 35 so that fluid under pressure that is supplied to the chamber will force the sleeve piston upwardly along the stem. The upper packer element 11, which is made of a suitable elastomer material, is mounted on the stem 26 between the upper end face 36 of the sleeve piston 18 and the lower end face 37 of a frustoconical ring 38 which is a component of the anti-extrusion assembly 17.

The anti-extrusion assembly 17 further includes a plurality of arcuate metallic segments 40 that are held together as a generally cylindrical unit by a resilient band of material 41 that is fitted in external annular recesses 42 formed in the respective exteriors of the segments 40. The lower end surface 43 of each of the segments 40 is formed with an inverted conical shape that is companion in inclination with the upper surface of the conical ring 38, and the upper end surface 44 of each of the segments is likewise conically shaped to match the inclined lower surface 45 of an upper conical ring 46 whose upper surface 47 abuts against the lower end surface 48 of the valve section 16. Thus arranged, when fluid pressure is applied to the chamber 33, the sleeve piston 18 will be forced to shift upwardly along the stem 34 to compress and foreshorten the packer element 11 and cause it to expand and sealingly engage the surrounding wall of the tubing as shown in FIG. 3. Upward force on the packer element 11 also will cause the lower conical ring 38 to move relatively toward the upper ring 46, whereby the inclined surfaces described above will cause radial expansion of the segments 40 in a manner to substantially close the annular gap through which the packer element might otherwise extrude.

The lower packer element 12, expander sleeve pistion 21 and anti-extrusion device 22 are arranged in the same structural relationship as the corresponding components described above, except for having an opposite or reverse orientation. The sleeve piston 21 is sealed by rings 50 and 51 with respect to the stem 52 and the reduced diameter section 53 of the body, to provide a variable capacity chamber 54 that is communicated by a port 55 to the central passage 34 near the lower closed end thereof. The cylindrical elastomer packing element 12 is positioned between a downwardly facing surface 56 of the sleeve pistion 21 and the upper face 57 of the conical expander ring 58 loosely received on the stem 52. The anti-extrusion device 22 includes a plurality of arcuate segments 60 that are encircled and held together as a cylindrical unit by an elastomer band 61 that fits in external grooves or recesses 62 in the segments, and a lower conical expander ring 63 that rests on the upper end face of the bottom nose 23 has an inclined upper surface 64 that mates with inclined lower surfaces 65 of the segments. When fluid under pressure is supplied to the chamber 54, the sleeve piston 21 is forced downwardly to compress and expand the packer element 12, and to cause the upper expander ring 58 to advance toward the lower ring 63 and thereby shift the segments 60 radially outwardly to close the extrusion gap between the body of the tool and the tubing wall adjacent the lower peripheral edge of the packer element.

Figure 4:
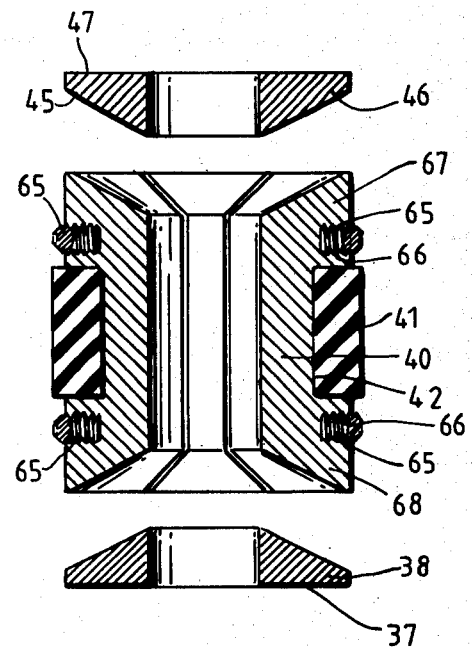
FIG. 4 is an enlarged, exploded view of an anti-extrusion device constructed in accordance with the present invention.
Figure 5:
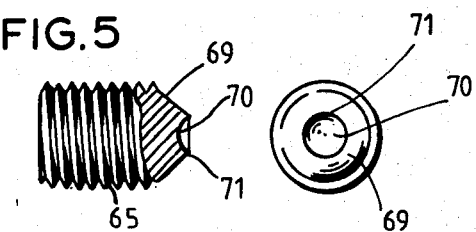
FIGS. 5-7 are enlarged views of various embodiments of gripping means that can be used in accordance with the present invention.
Figure 6:
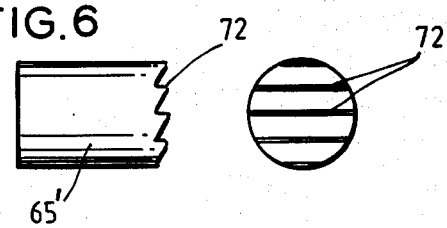
Figure 7:
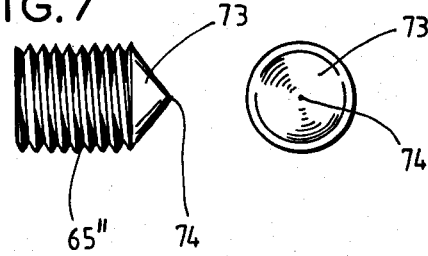

In accordance with the present invention, at least some of the segments 40 and 60 of at least one of anti-extrusion devices 17 and 22 are provided with gripping means so that upon being shifted outwardly as described above and as shown in FIG. 3, the gripping means will engage the inner wall of the tubing to prevent longitudinal movement of the tool during a pipe testing operation. As shown in enlarged detail in FIGS. 4 and 5, the gripping means can take the form of threaded plugs 65 that are screwed into radially directed holes 66 in the upper and lower portions 67 and 68 of each of the segments. The outer face of each plug 65 has a conically tapered face 69 that is provided with a central depression 70 which intersects the face to provide a circular edge 71 that is adapted to bite into and thus grip the tubing wall when the segments are expanded. Of course each of the plugs 65, rather than being threaded, could have a smooth outer surface and be press-fitted as an insert into a circular bore. In another embodiment shown in FIG. 6, each plug 65' can have wickers or teeth 72 formed on its outer periphery and be press-fitted or threaded into mating bores in the segments. The teeth 72 can be oriented so as to face upwardly on one of the segment assemblies and downwardly on the other, or to face upwardly and downwardly on each single segment assembly. In yet another embodiment shown in FIG. 7, the outer conical face 73 of each plug 65" converges to a point 74 which can bite into and grip the tubing wall. Other shapes and configurations will be apparent to those skilled in the art provided they have the capability of gripping the tubing wall when the segments of the anti-extrusion assemblies are shifted outwardly during operation of the test tool 10.

OPERATION

The test tool 10 assembled as shown in the drawings is inserted into the well pipe after the joints or connections between sections of the pipe are assembled at the surface of the well and before the pipe string is lowered into the well. The packer elements 11 and 12 are positioned on opposite sides of the joint to be tested, and fluid under pressure is then applied by pumping through the conduit 13 and into the central passage 34 of the test tool. The pressurized fluid enters the chambers 33 and 54 to force the respective sleeve pistons 18 and 21 against the packer elements 11 and 12 to thereby expand them and the segments of the anti-extrusion devices 17 and 22 into contact with the surrounding inner walls of the pipe as shown in FIG. 3. The packer elements 11 and 12 seal off the section of the pipe to be tested, and the pressure applied via the conduit 13 is increased to a desired test pressure. The hydraulic fluid flows as described in the above-mentioned U.S. Pat. No. 3,165,918 into the sealed off section externally of the test tool body and applies test pressure to the well pipe P. While such tests typically are conducted at the connection of two sections of pipe to determine if the connection is leakproof, it will be appreciated that testing may occur at any point along the length of the pipe section. Moreover, the test tool 10 may have its body of such a length that the packers 11 and 12 are spaced apart a distance greater than the length of several joints of well pipe and thereby provide a test for several pipe joint connections simultaneously. When the pressure applied to the sleeve pistons 18 and 21 is reduced, the packer elements 11 and 12 will inherently relax and retract to their normal diameters, and the elastomer bands that surround the segments 40 and 60 will cause them to shift radially inward to their retracted diameters.

When the segments 40, 60 of the anti-extrusion devices are shifted outwardly as described above, the gripping means 65 are forced into engagement with the adjacent walls of the well pipe and thus firmly grip the same to prevent longitudinal movement of the tool in the pipe. Thus even though the packer elements 11 and 12 are sealed against different internal diameters of the pipe, which provides a piston effect as previously noted, the test tool is maintained stationary in the pipe and will not be blown upward or downward therein during the testing operation.

It will now be recognized that a new and improved hydraulic pipe testing tool has been disclosed having means to anchor the same against movement in the well pipe under pressure. Since certain changes or modifications may be made in the disclosed embodiments without departing from the inventive concepts involved, it is the aim of the appended claims to cover all such changes and modifications falling within the true spirit and scope of the present invention.

What is claimed is:

1. A pipe testing tool comprising: a body member; normally retracted packing and anti-extrusion means mounted on said body member; and hydraulically operable means for expanding said packing and anti-extrusion means, said anti-extrusion means carrying gripping means on the outer periphery thereof that are adapted to engage the inner wall of a well conduit within which the tool is positioned to prevent longitudinal movement of said tool therein, said anti-extrusion comprising separate arcuate segments that are held together as a generally cylindrical unit by resilient means that encircles said segments, said segements having upper and lower end portions, said gripping means being mounted on said end portions, each of said gripping means comprising an element fixed in a radially directed opening in said end portion, said element having projecting means on its outer periphery adapted to bite into the wall of a well conduit.

2. The testing tool of claim 1 wherein said projecting means is formed by a conical surface having a central depression to provide a circular ridge on the outer face of said element.

3. The testing tool of claim 1 wherein said projecting means are formed by laterally extending teeth on the outer face of said element.

4. The testing tool of claim 1 wherein said projecting means are formed by a conical surface on the outer face of said element that terminates in a sharp point.

5. A pipe testing tool comprising: a body member; upper and lower normally retracted packing means carried by said body member; first anti-extrusion means above and adjacent said upper packing means and second anti-extrusion means below and adjacent said lower packing means; hydraulically operable means for expanding said packing means and said anti-extrusion means to provide a sealed annular region therebetween to which fluid under pressure can be supplied to test a pipe for leakage; each of said anti-extrusion means including a plurality of separate arcuate segments that are hold together as a generally cylindrical unit by an elastomer band that encircles said segments and is positioned in external recesses formed therein, each of said segments having upper and lower end portions; and gripping means carried by at least some of said end portions, said gripping means being adapted to bite into the inner wall surface of the pipe being tested when said segments are expanded to anchor said testing tool against longitudinal movement in the pipe, said gripping means comprising plugs fixed in radially directed bores in said end portions, said plugs having projecting means on the outer faces thereof.

6. The testing tool of claim 5 wherein said projecting means comprise circumferentially extending teeth.

7. The testing tool of claim 5 wherein said projecting means comprise conical surface means forming a sharp point at the apex thereof.

8. The testing tool of claim 5 wherein said projecting means comprise a conical surface leading to a depression in the center of said face to form a circular edge.

* * * * *